(No Model.)
W. N. GRAVES.
CLAY CUTTER AND PULVERIZER.
No. 330,691. Patented Nov. 17, 1885.
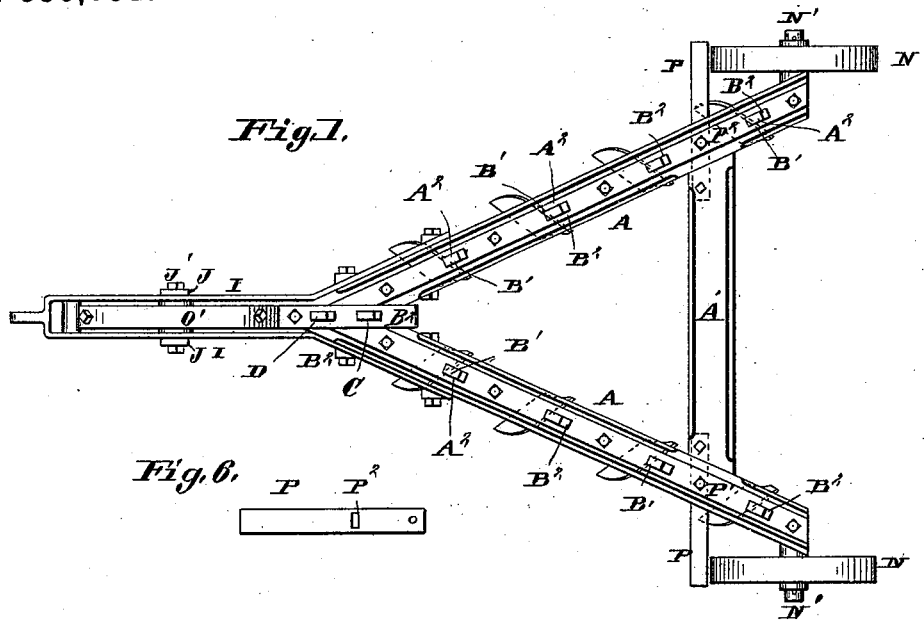
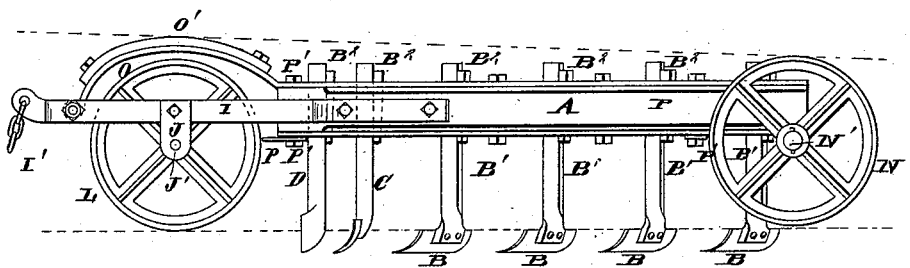
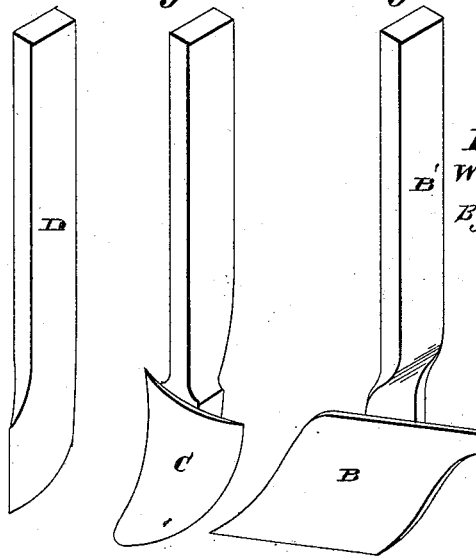
Attest:
F. A. Hopkins
H. S. Knight
Inventor;
Willis N. Graves
By Knight Bros
Att'ys

United States Patent Office.

WILLIS N. GRAVES, OF ST. LOUIS, MISSOURI, ASSIGNOR OF ONE-HALF TO THE HYDRAULIC PRESS BRICK COMPANY, OF SAME PLACE.

CLAY CUTTER AND PULVERIZER.

SPECIFICATION forming part of Letters Patent No. 330,691, dated November 17, 1885.

Application filed June 22, 1885. Serial No. 169,394. (No model.)

*To all whom it may concern:*

Be it known that I, WILLIS N. GRAVES, of the city of St. Louis, in the State of Missouri, have invented a certain new and useful Improvement in Clay Cutters and Pulverizers, of which the following is a full, clear, and exact description, reference being had to the accompanying drawings, forming part of this specification, and in which—

Figure 1 is a top or plan view of my improved device. Fig. 2 is a side elevation. Fig. 3 is a perspective view of the colter; Fig. 4, a similar view of the front plow, and Fig. 5 a similar view of one of the rear plows. Fig. 6 represents a scraper.

My invention relates to a device for cutting and pulverizing clay in the manufacture of bricks by passing it over the ground.

My invention consists in features of novelty hereinafter fully described, and pointed out in the claims.

Referring to the drawings, A represents a V-shaped frame, provided with a brace, A', and having sockets $A^2$ to receive the shanks B' of plows B, arranged obliquely toward the line of draft, one behind another, and shaped as shown in Fig. 5, those of one side being formed to throw to the right and those of the other side to the left, (see Fig. 1,) so that the clay is all thrown inward. They are held in the frame by wedges $B^2$ or by other suitable means. In front of the two rows of these plows is a central dividing-plow, C, held to the frame in line with the draft in the same way, and in front of this plow is a colter, D, to cut the clay in advance of the plow C, and this is held to the frame in like manner. Secured to the front end of the frame is a yoke or strap, I, provided at its outer end with a chain, I', for the attachment of a team. Depending from this yoke are plates J, one on each side, between which is journaled on a pin, J', a wheel, L, and similar wheels, N, are journaled on arbors or pins N', secured to the rear ends of the frame. The bottoms of these wheels are in line with the tops of the plows B, (see lower dotted line Fig. 2,) and they (the wheels) act to prevent the plows going into the ground beyond their depth. Secured over the front wheel is a runner, O, one end of which is made fast to the frame A and the other to the yoke I, as shown. This runner is preferably shod by a shoe, O', bolted to it. The top of the runner and wheels N is above the top of the plows, as shown by upper dotted lines, Fig. 2, and the object is to afford means for moving the device from one place to another by simply turning it over, when it will be supported on the runner and wheels N, and can be drawn by little power from place to place; and the object of having the runner instead of having the wheel L bear on the ground is to prevent the apparatus moving too freely down grade and running onto the team, it not being provided with a tongue. Each wheel is provided with a scraper, P, secured to the frame by bolts P', fitting in slots $P^2$ of the scrapers, and the scrapers can thus be adjusted toward the wheels as they wear out.

I claim as my invention—

1. In a clay cutter and pulverizer, the combination of a frame, A, of V shape, brace A', two series of plows, B, arranged as shown, central dividing-plow, C, cutter D in advance of the dividing-plow, strap I, having journal-plates J, pin J', having central wheel, L, in advance of the cutter, and arbors N', having the wheels N and secured at the rear ends of the frame, the plows turning toward the center, substantially as shown and described.

2. In a clay cutter and pulverizer, the combination of a frame, wheels for supporting the frame, extending above the latter, plows secured to the frame and turning toward the center, yoke secured to the front end of the frame, having draft-chain, and plates depending from the yoke, pin journaled in the plates and carrying the front wheel, and a runner over the latter, substantially as set forth.

3. In a clay cutter and pulverizer, the combination of a frame, wheels for supporting the frame, extending above the latter, plows secured to the frame and turning toward the center, yoke secured to the front end of the frame and supporting the latter on the front wheel, runner over the front wheel secured to the frame and yoke, and shoe secured to the runner, substantially as set forth.

WILLIS N. GRAVES.

In presence of—
   GEO. H. KNIGHT,
   SAML. KNIGHT.